(12) United States Patent
Colarik et al.

(10) Patent No.: US 6,394,390 B1
(45) Date of Patent: May 28, 2002

(54) HOOK CABLE SUPPORT ASSEMBLY (75) Inventors: David K. Colarik, Media; Thomas L. Quinn, Cochranville, both of PA (US)

(73) Assignee: Engineered Arresting Systems Corporation, Aston, PA (US)

( * ) Notice: Subject to any disclaimer, the term of this patent is extended or adjusted under 35 U.S.C. 154(b) by 20 days.

(21) Appl. No.: 09/689,100

(22) Filed: Oct. 12, 2000

(51) Int. Cl.$^7$ .................................................. B64F 1/02
(52) U.S. Cl. ................................................. 244/110 C
(58) Field of Search .......................... 244/110 C, 110 R (56) References Cited

U.S. PATENT DOCUMENTS 2,919,871 A * 1/1960 Sorensen ................. 244/110 C
3,000,596 A * 9/1961 Puffe ....................... 244/110 C

OTHER PUBLICATIONS

Scandinavian Manufacturing Inc., product brochure, 1995.

* cited by examiner

Primary Examiner—Galen L. Barefoot
(74) Attorney, Agent, or Firm—Kenneth P. Robinson (57) ABSTRACT

A hook cable support assembly is arranged to support a hook cable above a runway surface for arrestment of an aircraft having a tail hook. The operating mechanism of the support assembly is mounted to the detachable cover of an enclosure. A cable support block holding the hook cable can be rotated to lower the cable into a runway slot for non-arrested landings and can be depressed downward upon impact by an aircraft wheel. Support block rotation is controlled by a pneumatic cylinder and compression spring combination acting via a four-bar linkage. Support block upward recovery following depression is controlled by torsion springs. The cylinder and compression and torsion springs are mounted to the lower surface of the cover and function as a self-contained mechanism isolated from mechanical contact with the enclosure. With this cover-mounted configuration, the operating mechanism of the cable support assembly is removable for service or replacement by detachment of the cover.

14 Claims, 7 Drawing Sheets

HOOK CABLE SUPPORT ASSEMBLY

SEQUENCE LISTING (Not Applicable)

RELATED INVENTIONS (Not Applicable)

FEDERALLY SPONSORED RESEARCH (Not Applicable)

BACKGROUND OF THE INVENTION

This invention relates to arresting systems arranged to arrest the travel of aircraft during landing and, more particularly, to arrangements for supporting and lowering a cross-runway cable provided for engagement by the tail hook of an aircraft while landing.

A variety of aircraft arresting systems have been proposed and implemented. Systems particularly suited for arresting of military aircraft equipped with an integral tail hook typically provide a cable stretched across a landing surface for engagement by the tail hook. In some applications a runway is used for both arrested landings and non-arrested landings. For such use, cable support assemblies have been adapted to enable the cable, while stretched across the runway, to be alternatively positioned a few inches above the landing surface or lowered below the landing surface into a slot formed across the runway. When positioned above the runway, the cable is subjected to being run over by the wheels of aircraft and depressed downward. Also, the support members or blocks which position the cable above the landing surface may themselves be impacted by aircraft wheels and provision is typically made to permit the support blocks to be depressed upon impact.

Thus, for a retractable cable system, the support blocks must be implemented in a manner permitting both automated lowering of the cable into a runway slot, and resilient depressing of the support blocks while the cable is in its raised condition, Prior systems have employed cable support assemblies located in enclosures sunk below the landing surface and having covers which are flush with the landing surface and cable support blocks extendable upward through openings in the covers. Arrangements of springs and support block positioning and lowering members of significant complexity have typically been mounted within the enclosures and arranged for remote activation via fluid controlled piston configurations.

Figure 1:
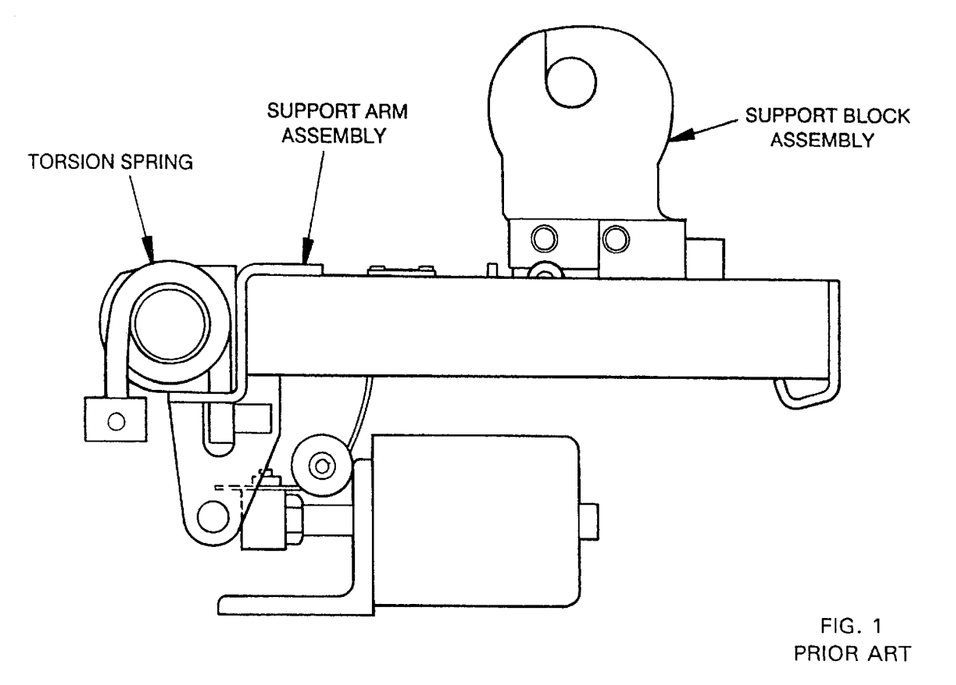
FIG. 1 is a side view of a prior cable support mechanism with cable support block raised.
Figure 2:
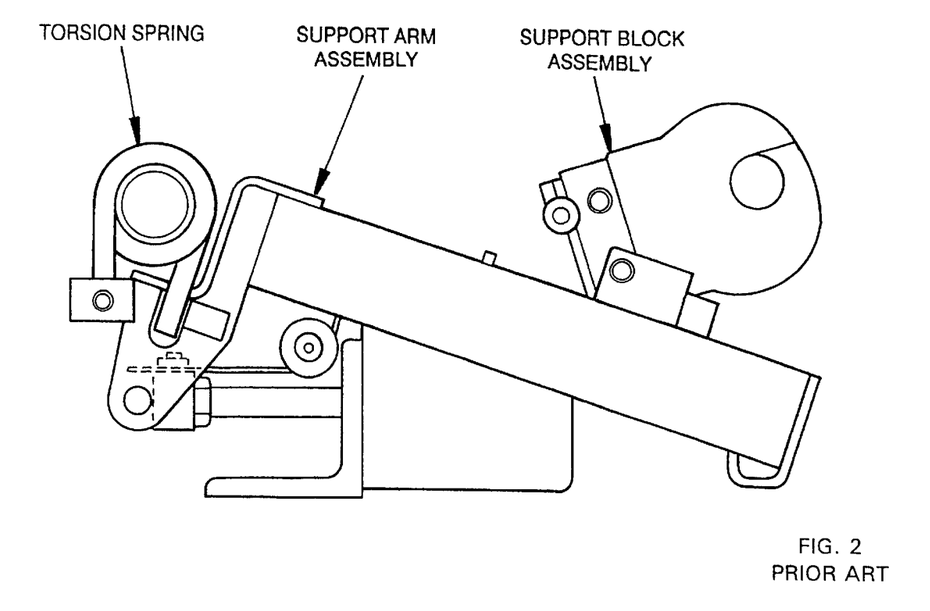
FIG. 2 shows the FIG. 1 mechanism with cable support block lowered.

FIGS. 1 and 2 illustrate basic components of a previous support block assembly produced by the assignee of the present invention. The components of the assembly are mounted to the sides and base of an enclosure, which is not shown. As represented in FIG. 1, the support arm assembly mounted within the enclosure beneath the landing surface is urged upward by the torsion spring, so as to cause the support block to protrude above the landing surface. The support block is constructed of durable rubber material and has a hole for cable insertion and a cut enabling the cable to be pulled from the support block when hooked by a landing aircraft. When an aircraft wheel strikes the support block, the torsion spring permits the support arm and support block to be depressed downward during passage of the wheel and then returned to the position shown in FIG. 1. FIG. 2 shows the support block lowered for non-arrested landings. Upon activation of the air cylinder the shaft of the piston overcomes the pressure provided by the torsion spring, so as to tilt the support arm downward from horizontal. At the same time, a short control cable is pulled around a pulley and trips a latch arrangement to permit springs to tilt the support block so that an arresting cable held by the support block is lowered into a slot extending across the runway. From the FIG. 2 lowered-cable position, the support block may be returned to its FIG. 1 position by release of piston pressure in the air cylinder, to permit the torsion spring to move the support arm to a horizontal position. At the same time, the support block is returned to its former upright position and latched in place. While the mechanism of FIGS. 1 and 2 continues to provide excellent performance in runway installations, it is desired to provide improved configurations.

Objects of the present invention are, therefore, to provide new and improved hook cable support assemblies and such assemblies having one or more of the following advantages and characteristics:

operating mechanism of support assembly mounted to hinged enclosure cover for ease of servicing and removal;

support arm assembly rotatably mounted to detachable enclosure cover;

all other active components of support assembly mounted to support arm assembly;

control of support block depression during aircraft roll over, by torsion spring carried on enclosure cover;

control of support block tilt for cable raising, by compression spring carried on enclosure cover;

increased time between repairs by use of separately functioning torsion spring and compression spring assemblies; and long term cost reduction by ease of installation, maintenance, and component and assembly replacement.

SUMMARY OF THE INVENTION

In accordance with the invention, a hook cable support assembly, for an aircraft arresting system, comprises the following:

an assembly enclosure having a detachable cover with a pivot structure mounted to the cover;

a support arm supported below the cover by the pivot structure and rotatable about an axis thereof;

a torsion spring device concentric to the pivot axis and arranged to rotate the support arm upward to a static alignment;

a cable support block mounted to the support arm and rotatable between raised and lowered positions;

a four-bar linkage coupled between the support arm and the support block and operable to rotate the support block;

a cylinder/piston device coupled between the support arm and the four-bar linkage and operable on the four-bar linkage to rotate the support block to its lowered position; and a compression spring device mounted between the support arm and the four-bar linkage and arranged to cause the linkage to rotate the support block to its raised position in the absence of action by the cylinder/piston device to rotate the support block to its lowered position.

Pursuant to the invention, the detachable cover and subsequent components referred to above form an operating mechanism removable from the enclosure by detachment of the cover and associated air supply hose.

For a better understanding of the invention, together with other and further objects, reference is made to the accompanying drawings and the scope of the invention will be pointed out in the accompanying claims.

DESCRIPTION OF THE INVENTION

Figure 3:
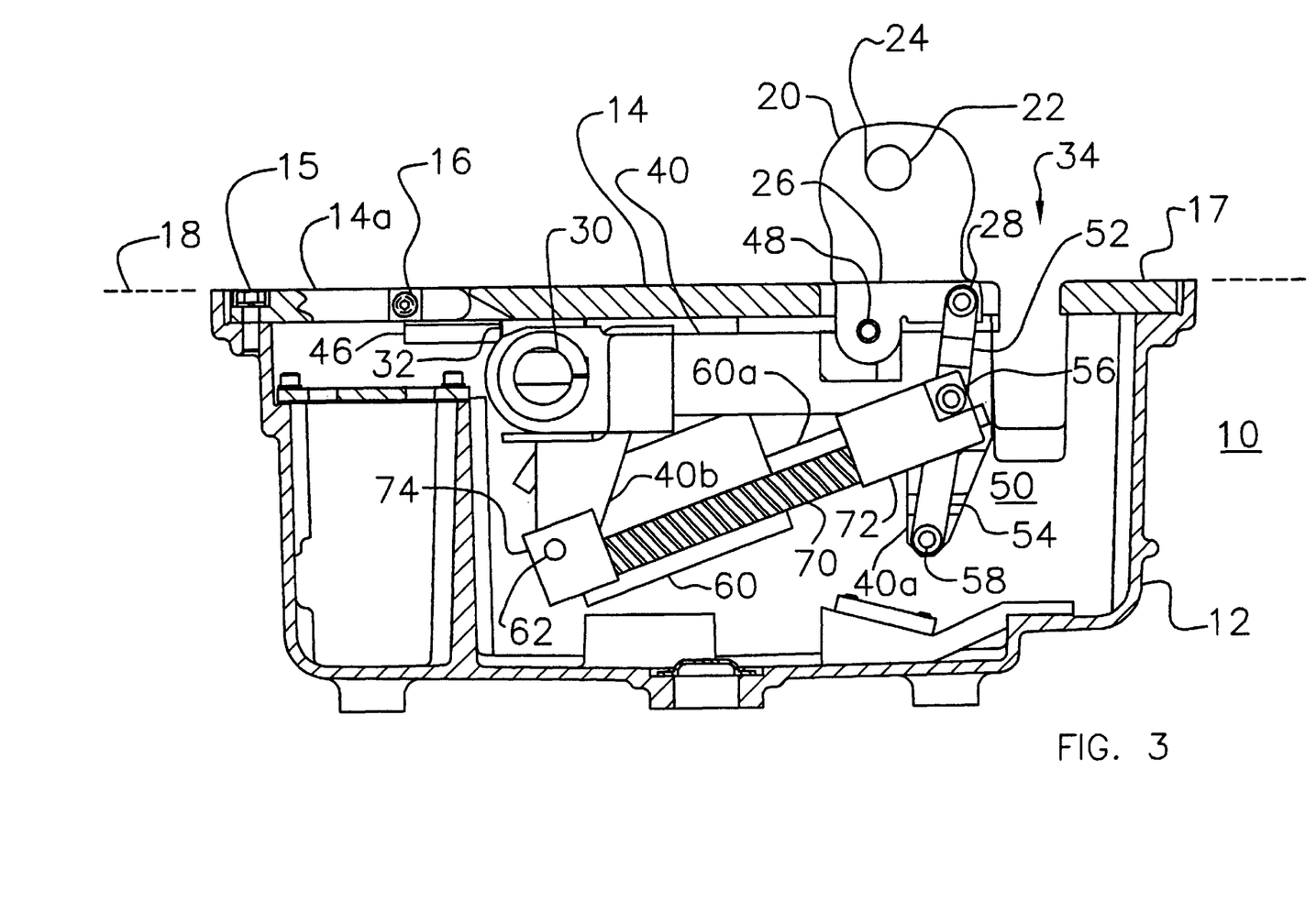
FIG. 3 is a side view of an embodiment of a hook cable support assembly in accordance with the invention, with cable support block raised.
Figure 8:
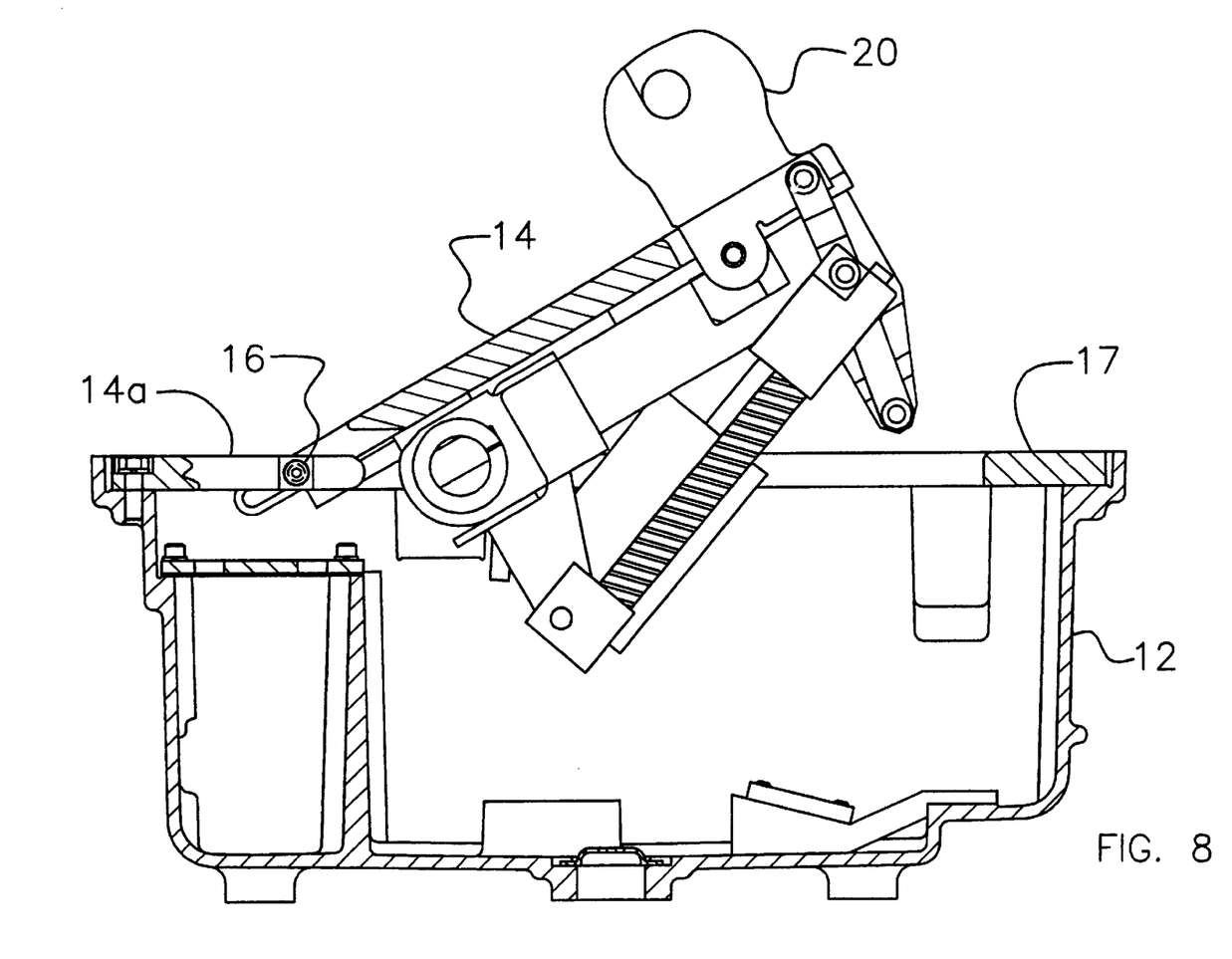
FIG. 8 shows the enclosure cover partially opened, raising the operating mechanism.

FIG. 3 is a side view of a hook cable support assembly 10 in accordance with the invention. Upon arresting system installation, assembly enclosure 12 is sunk into the runway or other landing surface, with the upper surface of cover 14 level with the landing surface represented by dashed line 18. As shown, assembly enclosure 12 has a detachable cover 14. Enclosure 12 and cover 14 are shown in section, with the portion toward the viewer removed for purposes of illustration. Cover 14 is hinged via hinge pins 16 to permit the main portion 14 to be rotated upward to the left, as shown in FIG. 8. Cover portion 14a, shown to the left, remains bolted to enclosure 12 when the main portion is rotated upward as in FIG. 8. For removal of the cover from the enclosure 12, main cover portion 14 and portion 14a may be detached by removal of bolts, of which bolt 15 is typical (the openings for placement of the bolts are represented in the top view of FIG. 5). To the right in FIGS. 3 and 8 is shown an additional cover section 17, which is separate from cover portions 14 and 14a.

Figure 4:
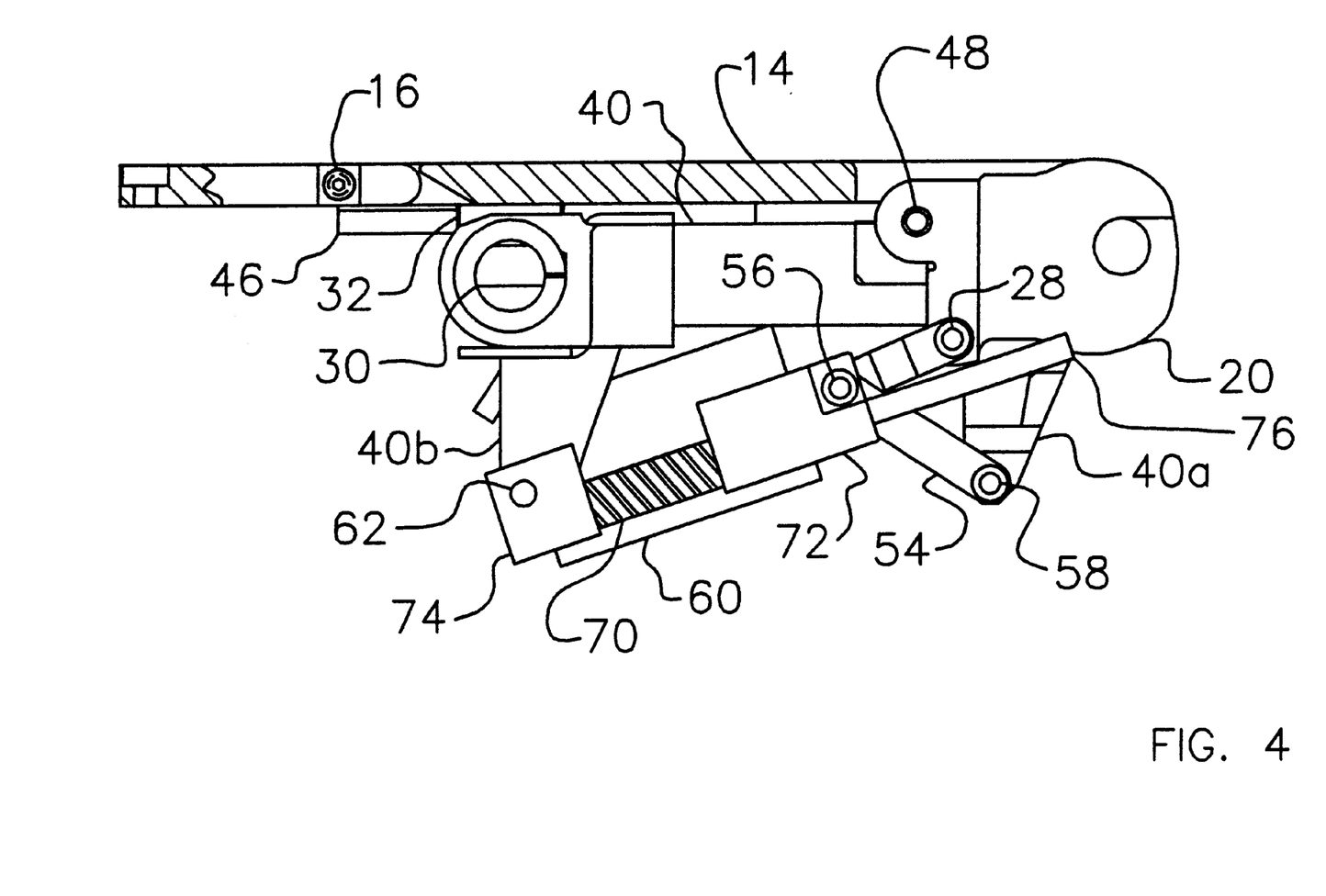
FIG. 4 is a side view of the FIG. 3 embodiment with the lower enclosure removed and cable support block lowered.
Figure 5:
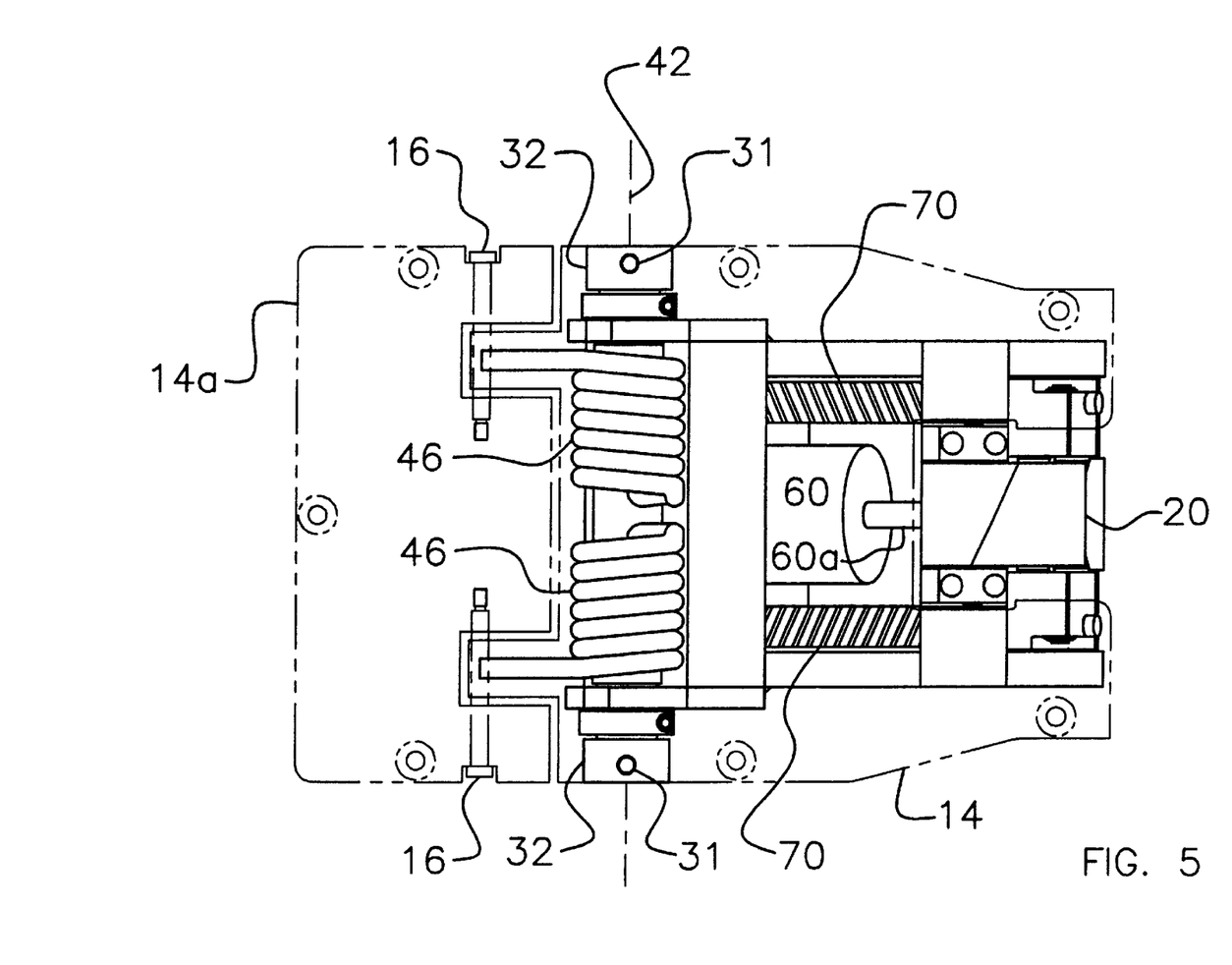
FIG. 5 is a plan view of the FIG. 3 embodiment with the lower enclosure removed.
Figure 6:
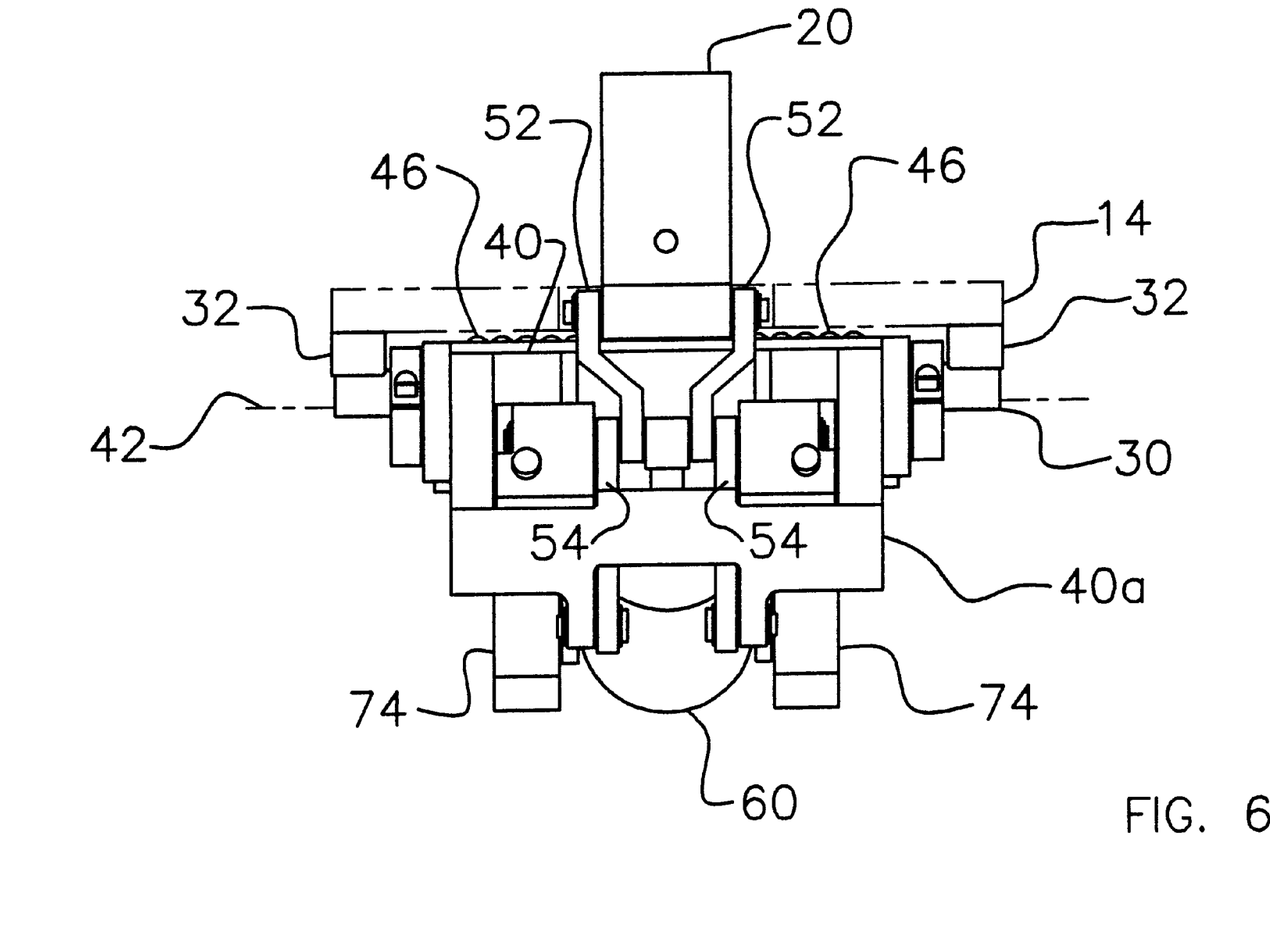
FIG. 6 is an end view of the FIG. 3 embodiment with the lower enclosure removed.

In FIG. 3 cable support block 20 is in a raised position suitable for supporting an arresting cable or pendant (not shown) by insertion in the circular opening 22 in the block. Cable support block 20 may be formed of a neoprene rubber compound or other suitable material and includes a cut or slit 24 which permits removal of the cable when engaged by the tail hook of an aircraft during landing. Block 20 also includes a structural base 26 to be described further below. FIG. 4 is similar to FIG. 3, except that cable support block 20 has been rotated to a lowered position and the cover 14 has been detached from enclosure 12, which is not shown. With block 20 in its lowered position of FIG. 4, an arresting cable inserted into opening 22 would be lowered into a cross-runway slot 34, shown in cross section in FIG. 3. FIGS. 5 and 6 are respective plan and end views of the FIG. 3 support assembly with block 20 rotated to its raised position and cover 14 detached from enclosure 12 and shown transparent.

Cover 14 has a pivot structure mounted to (e.g., attached to or formed integrally with) its lower surface. The pivot structure as illustrated includes horizontal shaft 30 and pivot support brackets 32 visible in FIG. 6, which extend downward from the lower surface of cover 14 to support shaft 30. Shaft 30, which at each end has a portion removed to form a flat, is bolted to cover 14 by bolts 31 extending through brackets 32 into shaft 30.

Support assembly 10 includes support arm 40 which is supported below cover 14 by the pivot structure 30/32. Support arm 40 is arranged to be rotatable about an axis 42 extending horizontally through the center of shaft 30. Axis 42 is represented in FIGS. 5 and 6. Support arm 40 is a structural member configured to support movable components of the support assembly, excepting the cover 14 itself. As shown in end view in FIG. 3 and top view in FIG. 5, assembly 10 includes a torsion spring device 46 comprising two torsion springs positioned concentric to shaft 30. The springs 46 are arranged (e.g., pre-tensioned upon installation) to rotate support arm 40 upward to a static alignment, which is the horizontal alignment illustrated in FIG. 3. Cable support block 20, previously referred to, is mounted to the support arm and rotatable between raised and lowered positions respectively shown in FIGS. 3 and 4. As will be described further with reference to FIG. 7, support arm 40 (together with all components mounted on it) is rotatable downward in response to an aircraft wheel contacting support block 20 while in its raised position. Torsion springs 46 are arranged to permit support arm 40 to rotate downward, and then return it to its static horizontal position when downward pressure on support block 20 is removed.

Components mounted on support arm 40 and arranged to rotate cable support block 20 between its raised and lowered positions will now be considered. As illustrated, there are mounted to support arm 40 the following: four-bar linkage 50, cylinder/piston device 60 and compression spring device 70. Support block 20 is rotatably mounted to support arm 40 via shaft 48, which is fixed to the support arm. Support block 20, formed basically of rubber material, includes a structural support member or base 26 affixed to the bottom thereof. Base 26 is attached to and arranged for rotation around shaft 48, and also supports an additional shaft 28.

Four-bar linkage 50 includes an upper bar 52 rotatable about shaft 28 of base 26 and a lower bar 54 rotatably attached to upper bar 52 via shaft 56. Base 26 of block 20 acts as a third bar rotatably fixed to support arm 40 via shaft 48. As shown, the lower end of lower bar 54 is rotatably fixed to a downward extending structural portion 40a of support arm 40, via shaft 58. With extremities of both lower bar 54 and base 26 (the "third bar") thus fixed to support arm 40 at separated points, support arm 40 itself is effective to act as a fourth bar, extending between shafts 48 and 58. As will be described further, with this configuration movement of shaft 56 to the left in FIG. 3 is effective to rotate support block 20 to its lowered position as illustrated in FIG. 4. The four-bar linkage 50 of support assembly 10, as thus configured, actually comprises two four-bar configurations arranged to function in parallel. As partially visible in the end view of FIG. 6, there are respective sets of upper and lower bars 52 and 54 at each side of support block 20. For each set, the upper bar is rotatably fixed to shaft 28, the lower bar is rotatably fixed to a separate shaft 58, and the upper and lower bars are commonly rotatably fixed to shaft 56. Third and fourth bars for each of the two parallel four-bar configurations are thus provided by base 26 and support arm 40.

Cylinder/piston device 60 typically comprises a pneumatic cylinder arranged to be remotely activated in known manner by application of compressed air via one or more flexible air hoses (not shown). Compressed air of suitable pressure can be controllably provided via air supply tubes from a central pressurized tank (not shown) by application of known techniques. In a currently preferred embodiment device 60 is a pneumatic cylinder with a 3 inch bore and 5 inch piston stroke. A suitable hydraulic cylinder may be used in other embodiments. As shown in FIG. 3, in this embodiment when device 60 is not actuated the piston rod 60a is in an extended position. The piston rod 60a is rotatably fixed at its far end to shaft 56 at a position between the attachments of the respective bars of the two parallel four-bar configurations. As shown, the cylinder portion of cylinder/piston device 60 is rotatably fixed to a downward extending structural portion 40b of support arm 40, via shaft 62. FIG. 4 illustrates the state of support assembly 10 when cylinder/piston device 60 is actuated to cause the piston rod 60a portion to be retracted into the cylinder portion.

As illustrated, the support assembly 10 further includes a compression spring device 70 comprising two compression springs arranged to function in parallel. As shown in FIG. 3, one end of the compression spring 70 which is visible in this view is attached to a spring guide 72 which is rotatably fixed to shaft 56 and the other end is attached to a spring guide 74 which is rotatably fixed to shaft 62. A guide rod, which is visible in FIG. 4, is fixed at one end to spring guide 74. Spring guide 72 is free to slide over guide rod 76, which keeps the spring guides 72 and 74 from rotating about their respective shafts 56 and 62. The second compression spring 70, which is partially visible in the view of FIG. 5, is similarly supported between shafts 56 and 62. The compression springs 70 and cylinder/piston device 60 are thus effectively arranged for parallel counter action. That is to say, when device 60 is actuated its piston rod 60a is retracted, thereby compressing springs 70 as illustrated in FIG. 4. In the absence of actuation of device 60 the springs 70 drive the piston rod 60a out to its extended position as illustrated in FIG. 3. The four-bar linkage is thereby operable to rotate support block 20 to its respective raised and lowered positions of FIGS. 3 and 4. Other physical details of the illustrated embodiment can be provided as shown or in modified form by skilled persons once having an understanding of the invention. Dimensions are not necessarily accurate as shown, as certain dimensions may be changed for clarity of illustration.

Figure 7:
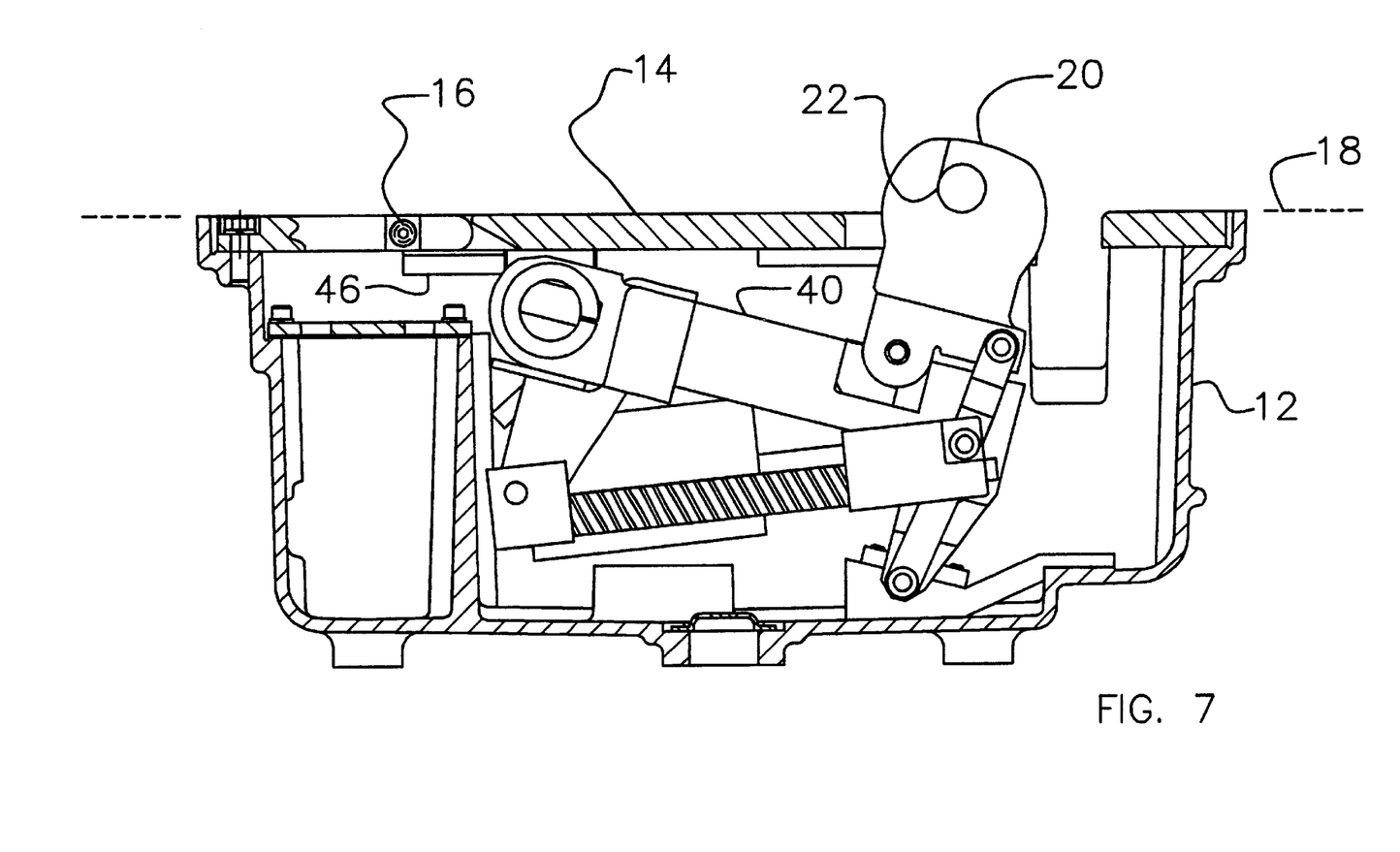
FIG. 7 corresponds to FIG. 3, with the cable support block displaced downward.

As illustrated and described, hook cable support assembly 10 provides two modes of operation. In a first mode, a hook cable inserted in the opening 22 in cable support block 20 is suspended above detachable cover 14, whose upper surface is level with a landing surface 18 (see FIG. 3). In this mode, for non-arrested landings the hook cable can be positioned below the landing surface by actuating cylinder/piston device to cause rotation of support block 20 to its lowered position (see FIG. 4). In a second mode, when an aircraft wheel impacts the support block while in its raised position, as in FIG. 3, downward pressure from the aircraft wheel causes support arm 40 to rotate or tilt downward so that support block 20 is displaced to a lower position, as illustrated in FIG. 7. With block 20 in this displaced position, a hook cable (not shown) held in opening 22 would lie across the landing surface of a runway. Passage of the aircraft wheel is thus facilitated, without destruction of the support block. When an aircraft wheel impacts the supported hook cable without directly impacting the support block, the cable is forced downward toward the landing surface and an adjacent support block may or may not be displaced downward to some degree. As will be apparent from the following more detailed discussion of the mechanical action involved in each such mode of operation, an important feature of the invention is that all interacting mechanical components are mounted to cover 14. As a result, for servicing, repair or replacement the entire operative mechanism may be rotated upward about hinge pins 16 or removed by detaching cover 14 from enclosure 12. FIG. 8 shows the cover partially opened to provide servicing access. A flexible air line attachment (not shown) connected to cylinder/piston device 60 requires detachment when detaching the cover, however, in the illustrated embodiment all other operative components are attached to the cover and not to the walls or base of the enclosure.

Operation of the support assembly can be further considered in view of FIGS. 3 and 7. In FIG. 3 support block 20 is in its raised position. Four-bar linkage 50 has its shaft 56 in its furthest position to the right in FIG. 3. Pressure from compression springs 70 pushes shaft 56 to the alignment illustrated in FIG. 3. In this alignment, arms 52 and 54 are in an "over center" position, with the centerline of shaft 56 displaced slightly to the right relative to a line joining the centerlines of shafts 28 and 58. In this position, shaft 56 is physically prevented from moving further to the right by a suitable stop or other means. Pursuant to the first mode of operation, with shaft 56 in this position downward pressure on support block 20 during roll over by an aircraft wheel has the effect of causing downward rotation of support arm 40 about the axis of shaft 30, thereby displacing support block 20 downward relative to the landing surface represented by dashed line 18. This downward displaced configuration is shown in FIG. 7. With the over center positioning of shaft 56, relative to shafts 28 and 58, downward pressure on support block 20 does not result in movement of shaft 56 to the left in FIG. 3 (which would produce rotation of support block 20 as in the second mode of operation to be further described). When no downward pressure is applied to support block 20, torsion springs 46 are effective to rotate support arm 40 (and thereby support block 20) upward to the static alignment shown in FIGS. 3 and 5 (and also FIG. 6). The first operational mode thus comprises two configurations of the mechanism. In one configuration support arm 40 is forced downward by pressure upon support block 20, causing rotation downward around shaft 30 while overcoming counter-rotational force from springs 46 (FIG. 7). In the second configuration of the first mode support arm 40 is returned to its static position as illustrated, by action of torsion springs 46 (FIG. 3).

The second operational mode of support assembly 10 also comprises two configurations of the mechanism. In the first configuration, compression springs 70 are effective to move the bars of four-bar linkage 50 to the alignment shown in FIG. 3, and thereby to provide the over center alignment described above. In the second configuration, cylinder/piston device 60 is actuated by application of compressed air to retract the piston rod 60a and thereby move the bars of the four-bar linkage 50 to the alignment shown in FIG. 4. As illustrated, this alignment of the four-bar linkage is effective to rotate support block 20 from its raised position of FIG. 3 to its lowered position of FIG. 4. An important operational fail/safe feature is that unless cylinder/piston device 60 is actuated, compression springs 70 are effective to position support block 20 in its raised position, and thereby suspend an associated hook cable above the landing surface in position to provide aircraft arrestment.

As already discussed, hook cable support assembly construction pursuant to the invention permits all of the mechanical elements necessary to implement both described configurations of each of the first and second operational modes to be mounted to the cover 14 of the support assembly. And to thereby enable ready access by tilting the cover as in FIG. 8 and removal of the entire mechanism by detaching the cover. This result is obtained via the novel combination of four-bar linkage 50, compression springs 70 and torsion springs 46, each acting between points carried on support arm 40 or between arm 40 and cover 14, with no operative connection to the sides or bottom of the enclosure 12.

While there have been described the currently preferred embodiments of the invention, those skilled in the art will recognize that other and further modifications may be made without departing from the invention and it is intended to claim all modifications and variations as fall within the scope of the invention.

What is claimed is:

1. A hook cable support assembly, for an aircraft arresting system, comprising:
    an assembly enclosure having a detachable cover with a pivot structure mounted to the cover;
    a support arm supported below the cover by the pivot structure and rotatable about an axis thereof;
    a torsion spring device concentric to said axis and arranged to rotate the support arm upward to a static alignment;
    a cable support block mounted to the support arm and rotatable between raised and lowered positions;
    a four-bar linkage coupled between the support arm and the support block and operable to rotate the support block;
    a cylinder/piston device coupled between the support arm and the four-bar linkage and operable on the four-bar linkage to rotate the support block to its lowered position; and
    a compression spring device mounted between the support arm and the four-bar linkage and arranged to cause the linkage to rotate the support block to its raised position in the absence of action by the cylinder/piston device to rotate the support block to its lowered position.

2. A hook cable support assembly as in claim 1, wherein the support arm, torsion spring device, cable support block, four-bar linkage, cylinder/piston device and compression spring device are supported from the lower side of the cover and removable from the assembly enclosure upon detachment of the cover from the enclosure.

3. A hook cable support assembly as in claim 1, wherein the cover is detachable from and hinged to the assembly enclosure.

4. A hook cable support assembly as in claim 1, wherein the torsion spring device comprises two torsion springs and in said static alignment the principal dimension of the support arm is nominally parallel to the lower side of the cover.

5. A hook cable support assembly as in claim 1, wherein the torsion spring device is arranged to permit the support arm to be rotated downward while downward pressure is exerted on the cable support block while in its raised position, and thereafter return the support arm to its static alignment.

6. A hook cable support assembly as in claim 1, wherein the cable support block, when in its raised position, is configured to support a hook cable above an aircraft landing surface and, when in its lowered position, is configured to retract the hook cable into a slot in the landing surface.

7. A hook cable support assembly as in claim 1, wherein the four-bar linkage, when it has rotated the cable support block to its raised position, reaches a locked, over center position preventing forces on the support block from rotating it to its lowered position.

8. A hook cable support assembly as in claim 1, wherein the four-bar linkage comprises two four-bar configurations arranged to function in parallel.

9. A hook cable support assembly as in claim 8, wherein the compression spring device comprises two compression springs arranged in parallel, with each connected between a mounting on the support arm and a different one of the four-bar configurations.

10. A hook cable support assembly as in claim 1, wherein the cylinder/piston device comprises a pneumatic cylinder and piston assembly, including a piston rod connected to the four-bar linkage.

11. A hook cable support assembly as in claim 1, wherein the cylinder/piston device, when actuated, is arranged to cause the four-bar linkage to rotate the support block to its lowered position, and the compression spring device is arranged to cause the four-bar linkage to rotate the support block to its raised position both upon non-actuation of and upon failure of the cylinder/piston device.

12. For use in an aircraft arresting system, a hook cable support assembly, of the type including an enclosure having a detachable cover and wherein a cable support block is arranged to be lowered alternatively by being depressed by exertion of downward pressure or by being rotated from a raised to a lowered position, comprising:
    at least one torsion spring arranged to permit the cable support block and its support structure to rotate downward upon exertion of downward pressure and, in the absence of such pressure, to rotate the support block and its support structure upward to a static position; and
    at least one compression spring arranged to maintain the cable support block in its raised position, in the absence of an overriding action adequate to overcome force exerted by said compression spring to thereby rotate the support block to its lowered position;
    said torsion and compression springs mounted to said detachable cover, without connection to the enclosure, and removable with the cover upon detachment thereof.

13. A hook cable support assembly as in claim 12, additionally comprising:
    a four-bar linkage coupled to said compression spring and operable to rotate the support block between its raised and lowered positions.

14. A hook cable support assembly as in claim 13, additionally comprising:
    a cylinder/piston device coupled to the four-bar linkage and actuatable to cause said linkage to rotate the support block to its lowered position.

* * * * *